United States Patent
Chen et al.

(10) Patent No.: US 8,365,632 B2
(45) Date of Patent: Feb. 5, 2013

(54) CARTESIAN COORDINATE ROBOT

(75) Inventors: Wen-Sheng Chen, Shenzhen (CN);
Da-Wei Liu, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 539 days.

(21) Appl. No.: 12/694,604

(22) Filed: Jan. 27, 2010

(65) Prior Publication Data
US 2011/0132125 A1 Jun. 9, 2011

(30) Foreign Application Priority Data
Dec. 3, 2009 (CN) .......................... 2009 1 0310815

(51) Int. Cl.
*B25J 17/00* (2006.01)
*B25J 17/02* (2006.01)
*B25J 18/00* (2006.01)
(52) U.S. Cl. ...................................... 74/490.01; 901/16
(58) Field of Classification Search ............... 74/490.01; 901/14, 16
See application file for complete search history.

(56) References Cited

U.S. PATENT DOCUMENTS
| | | | |
|---|---|---|---|
| 6,545,440 B2 * | 4/2003 | Slater et al. | 318/567 |
| 6,761,522 B2 * | 7/2004 | Jager | 414/222.01 |
| 2002/0129673 A1 * | 9/2002 | Nakano | 74/490.09 |

FOREIGN PATENT DOCUMENTS
| | | |
|---|---|---|
| CN | 1488473 A | 4/2004 |
| CN | 2863382 Y | 1/2007 |
| CN | 101428656 A | 5/2009 |

* cited by examiner

*Primary Examiner* — Justin Krause
(74) *Attorney, Agent, or Firm* — Altis Law Group, Inc.

(57) ABSTRACT

A Cartesian coordinate robot includes a first transmission mechanism slidably connected to a second transmission mechanism, a third transmission mechanism slidably connected to the second transmission mechanism. The first transmission mechanism includes a first guide rail, a first slider slidably connected to the first guide rail, and a first driving module driving the first slider. The second transmission mechanism includes a second guide rail perpendicular to the first guide rail, a second slider slidably connected to the second guide rail, and a second driving module driving the second slider. The third transmission mechanism includes a third guide rail perpendicular to the first guide rail and the second rail, a third slider slidably connected to the third guide rail, and a third driving module driving the third slider.

17 Claims, 6 Drawing Sheets

CARTESIAN COORDINATE ROBOT

BACKGROUND

1. Technical Field

The present disclosure generally relates to robots and, particularly, to a Cartesian coordinate robot.

2. Description of Related Art

A Cartesian coordinate robot provides high movement precision and reliability, thus it is often used in performing welding, transport, assemblage, labeling, or other industrial manufacturing processes.

A commonly used Cartesian coordinate robot includes a first transmission arm, a second transmission arm, a third transmission arm, a coupling member/clutch mounted on the first transmission arm, and a servo motor connected to the coupling member. The three transmission arms are perpendicular to each other. The coupling member has an input shaft connected to the servo motor and three output shafts connected to the three transmission arms, respectively. The servo motor provides power to the coupling member which in turn drives the transmission arms. However, the coupling member only can only drive one transmission arm one at a time, because only one output shaft can communicate with the input shaft at a given time. Since the three transmission arms cannot move simultaneously, the Cartesian coordinate robot exhibits limited working efficiency.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
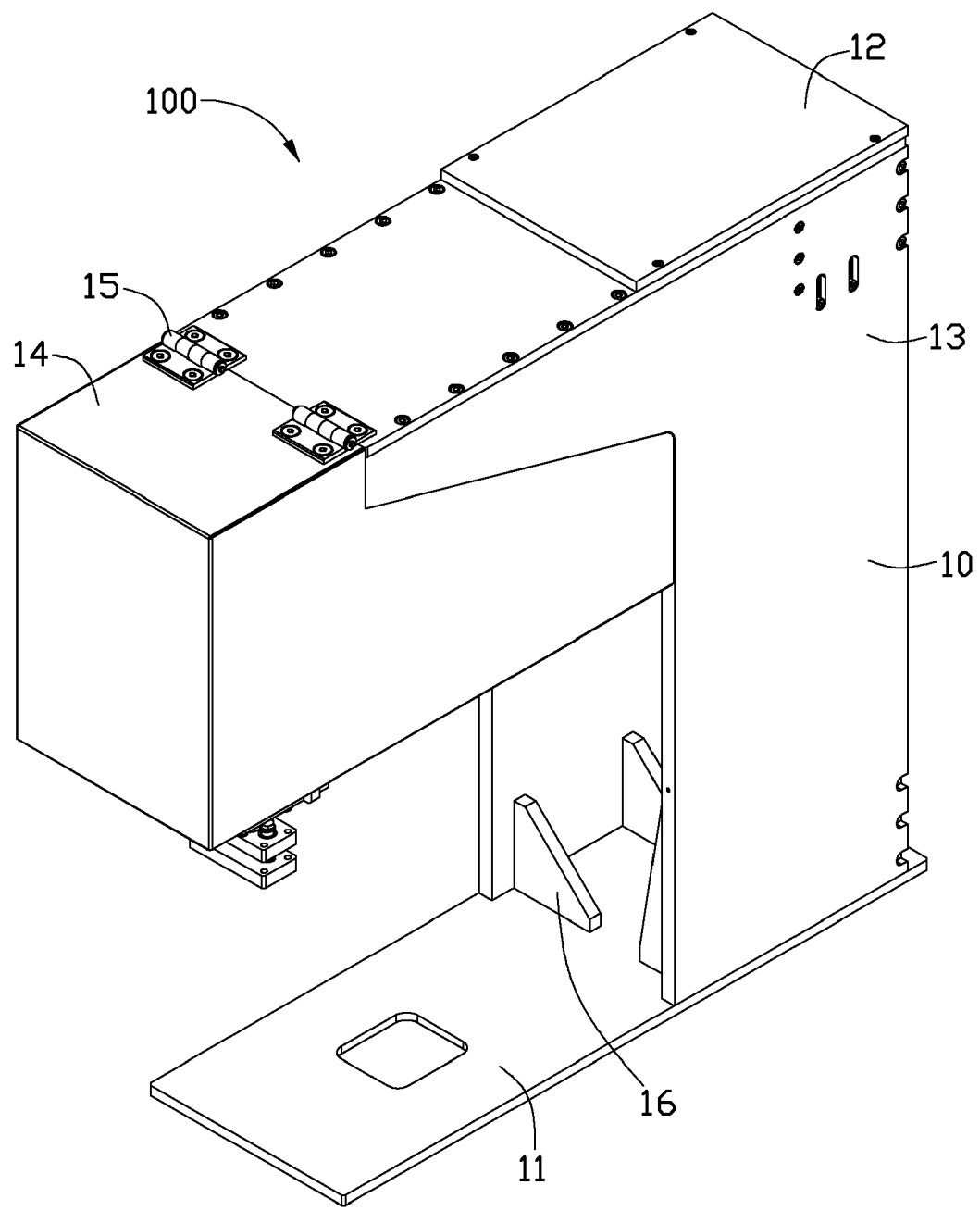
FIG. 1 is an assembled, isometric view of a Cartesian coordinate robot as disclosed, including a first transmission mechanism, a second transmission mechanism, a third transmission mechanism, and a fourth transmission mechanism.
Figure 2:
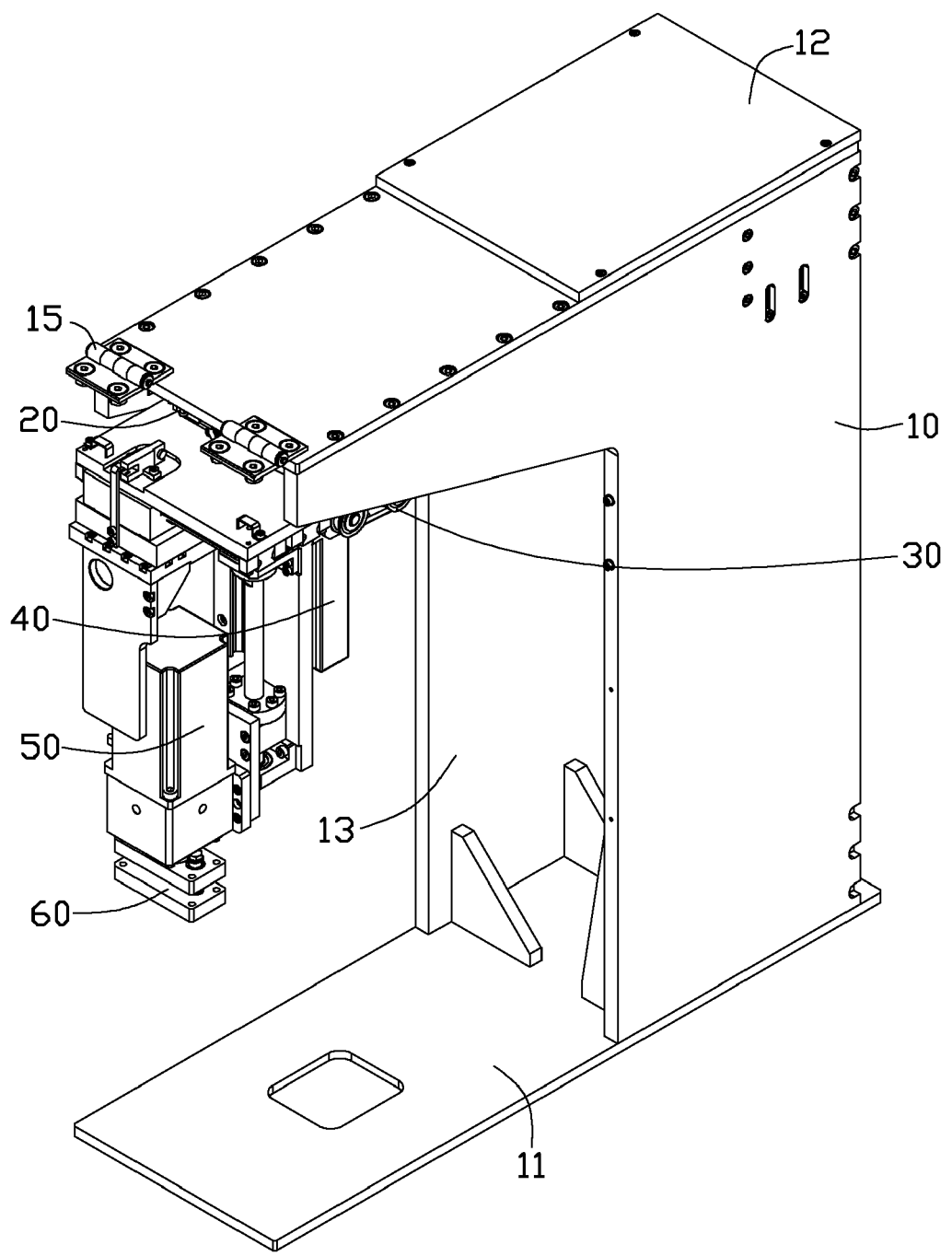
FIG. 2 is an assembled, isometric view of the Cartesian coordinate robot of FIG. 1, omitting a protective cover.

Referring to FIGS. 1 and 2, a Cartesian coordinate robot 100 includes a bracket 10, a first transmission mechanism 20, a second transmission mechanism 30, a third transmission mechanism 40, a fourth transmission mechanism 50, and a cushion mechanism 60. The first transmission mechanism 20 is secured on the bracket 10, the second transmission mechanism 30 connects with the first transmission mechanism 20, the third transmission mechanism 40 connects with the second transmission mechanism 30, the fourth transmission mechanism 50 connects with the third transmission mechanism 40, and the cushion mechanism 60 connects with the fourth transmission mechanism 50.

The bracket 10 includes a base plate 11, a top plate 12, a support plate 13, a protective cover 14, and a plurality of hinges 15. The base plate 11 and the top plate 12 are parallel to each other. The support plate 13 is connected between the base plate 11 and the top plate 12. The protective cover 14 is rotatably connected to the top plate 12 by the hinges 15. In the illustrated embodiment, two support plates 13 at opposite sides of the base plate 11 are each connected with the base plate 11 and the top plate 12 for ensuring maximum support and stability of the bracket 10. In addition, the bracket 10 also includes a plurality of stiffening ribs 16 arranged between the base plate 11 and the support plate 13.

Figure 3:
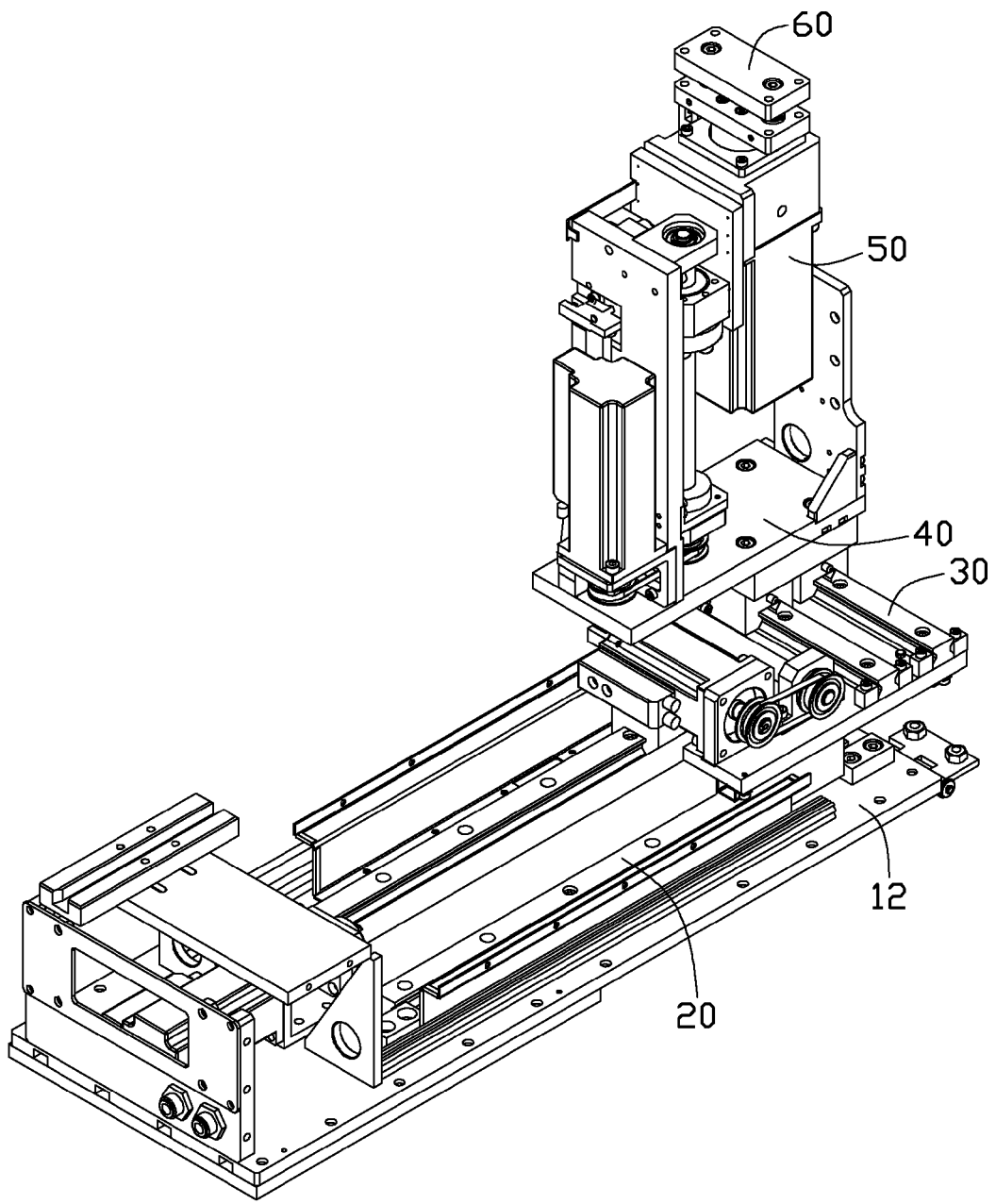
FIG. 3 is an assembled, isometric view of the Cartesian coordinate robot of FIG. 2, from another aspect omitting various parts of a bracket.
Figure 4:
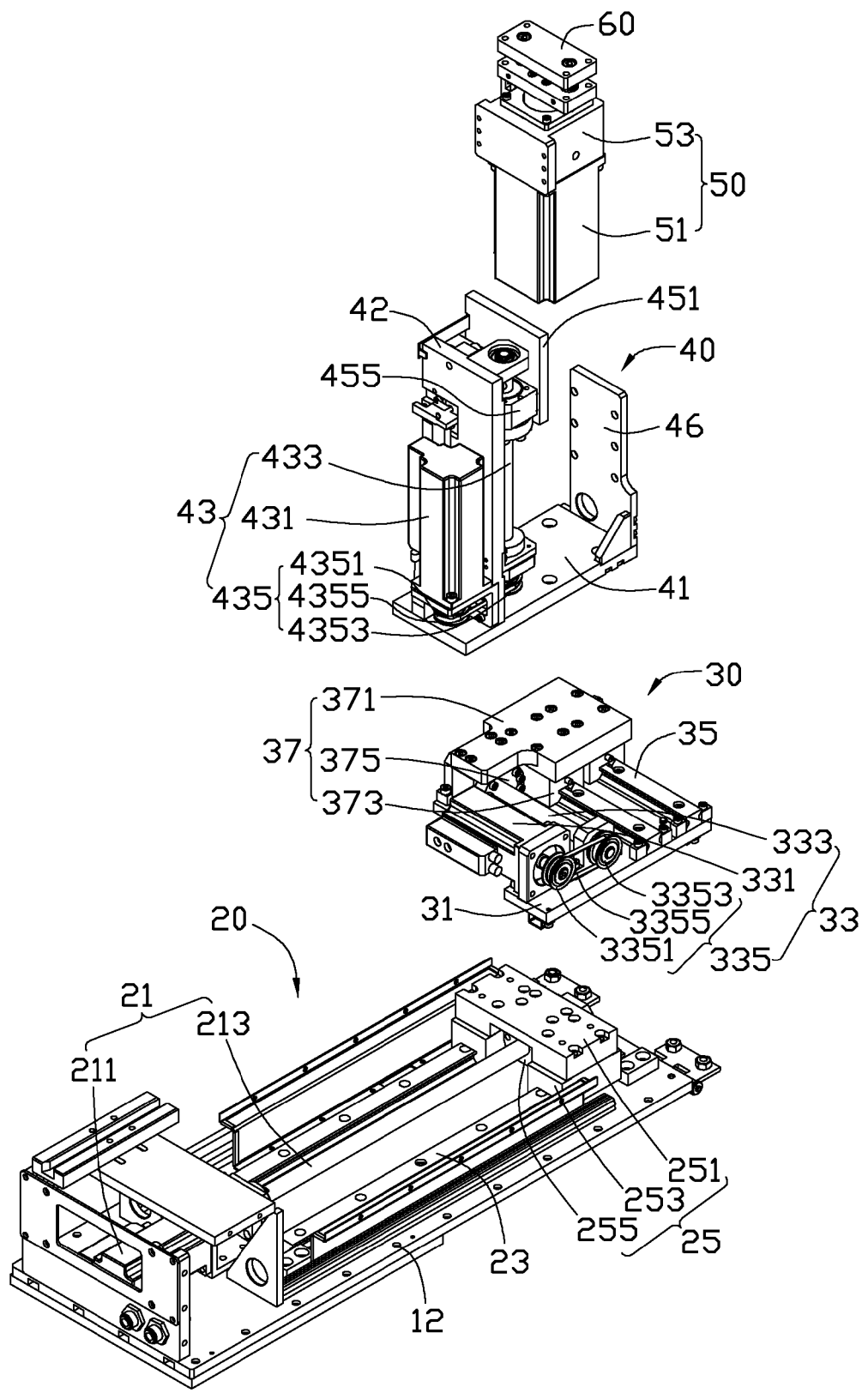
FIG. 4 is an exploded, isometric view of the Cartesian coordinate robot of FIG. 3.

Referring to FIGS. 3 and 4, the first transmission mechanism 20 includes a first driving module 21, two first guide rails 23, and a first slider 25. The first driving module 21 includes a motor 211 and a lead screw 213. The first guide rails 23, which are located on opposite sides of the lead screw 213, are substantially parallel to the lead screw 213. The first slider 25 includes a main body 251, two sliding portions 253, and a moving portion 255. The sliding portions 253 and the moving portion 255 protrude from the same surface of the main body 251, and the moving portion 255 is arranged between the sliding portions 253. The sliding portions 253 are slidably connected to the first guide rails 23, respectively; and the moving portion 255 is sleeved on the lead screw 213.

The second transmission mechanism 30 includes a fixing plate 31, a second driving module 33, two second guide rails 35, and a second slider 37. The second driving module 33 includes a motor 331, a lead screw 333, and a transmission assembly 335 connecting the motor 331 to the lead screw 333. The transmission assembly 335 includes a driving wheel 3351, which is connected to the motor 331, a driven wheel 3353, which is connected to the lead screw 333, and a transmission belt 3355, which is looped around the driving wheel 3351 and the driven wheel 3353. The motor 331 and the lead screw 333 are fixed on the fixing plate 31 side by side. The second guide rails 35 are substantially parallel to the lead screw 333, and are arranged on one side of the lead screw 333. The second slider 37 includes a main body 371, two sliding portions 373, and a moving portion 375. The sliding portions 373 and the moving portion 375 protrude from the same surface of the main body 371, and the sliding portions 373 are arranged on one side of the moving portion 375. The sliding portions 373 are slidably connected to the second guide rails 35, respectively, and the moving portion 375 is sleeved on the lead screw 333.

Figure 5:
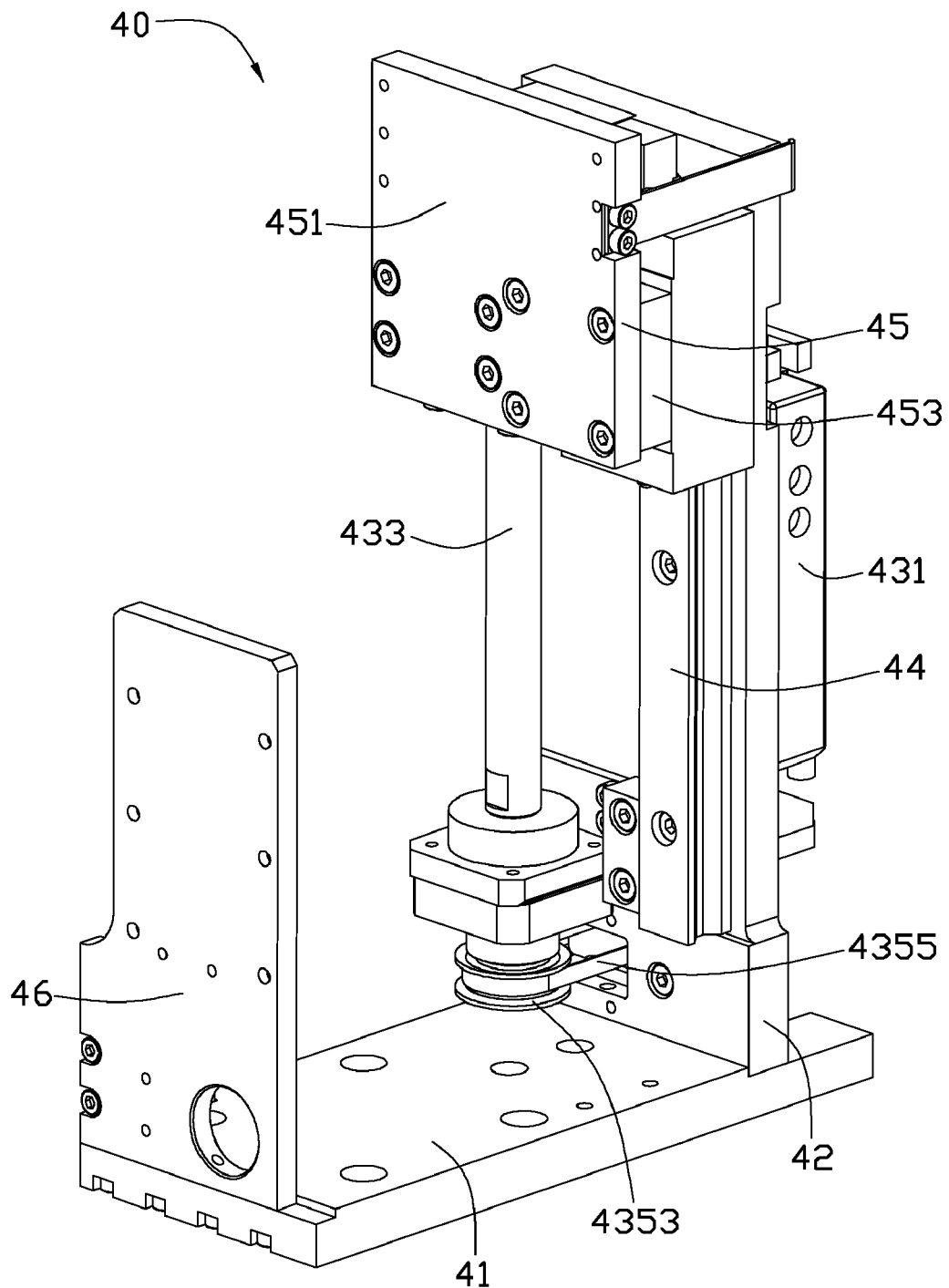
FIG. 5 is an assembled, isometric view of the third transmission mechanism of FIG. 4 from another aspect.

Referring to FIGS. 4 and 5, the third transmission mechanism 40 includes a mounting plate 41, a partition board 42, a third driving module 43, a third guide rail 44, and a third slider 45. The third driving module 43 includes a motor 431, a lead screw 433, and a transmission assembly 435, connecting the motor 431 to the lead screw 433. The transmission assembly 435 includes a driving wheel 4351, which is connected to the motor 431, a driven wheel 4353, which is connected to the lead screw 433, and a transmission belt 4355, which is looped around the driving wheel 4351 and the driven wheel 4353. The motor 431 and the lead screw 433 are fixed on the mounting plate 41, and are substantially perpendicular to the mounting plate 41. The lead screw 433 and the third guide rail 44 are arranged on the partition board 42; and the third guide rail 44 is substantially parallel to the lead screw 433. The third slider 45 includes a main body 451, a sliding portion 453, and a moving portion 455 (Where is 455 in the drawings? I could not find it). The sliding portion 453 and the moving portion 455 protrude from the same surface of the main body 451. The sliding portion 453 is slidably connected to the third guide rail 44; and the moving portion 455 is sleeved on the lead screw 433. In addition, the third transmission mechanism 40 further includes a back plate 46, which is substantially perpendicular to the mounting plate 41. The lead screw 433 and the third guide rail 44 are arranged between the partition board 42 and the back plate 46.

Figure 6:
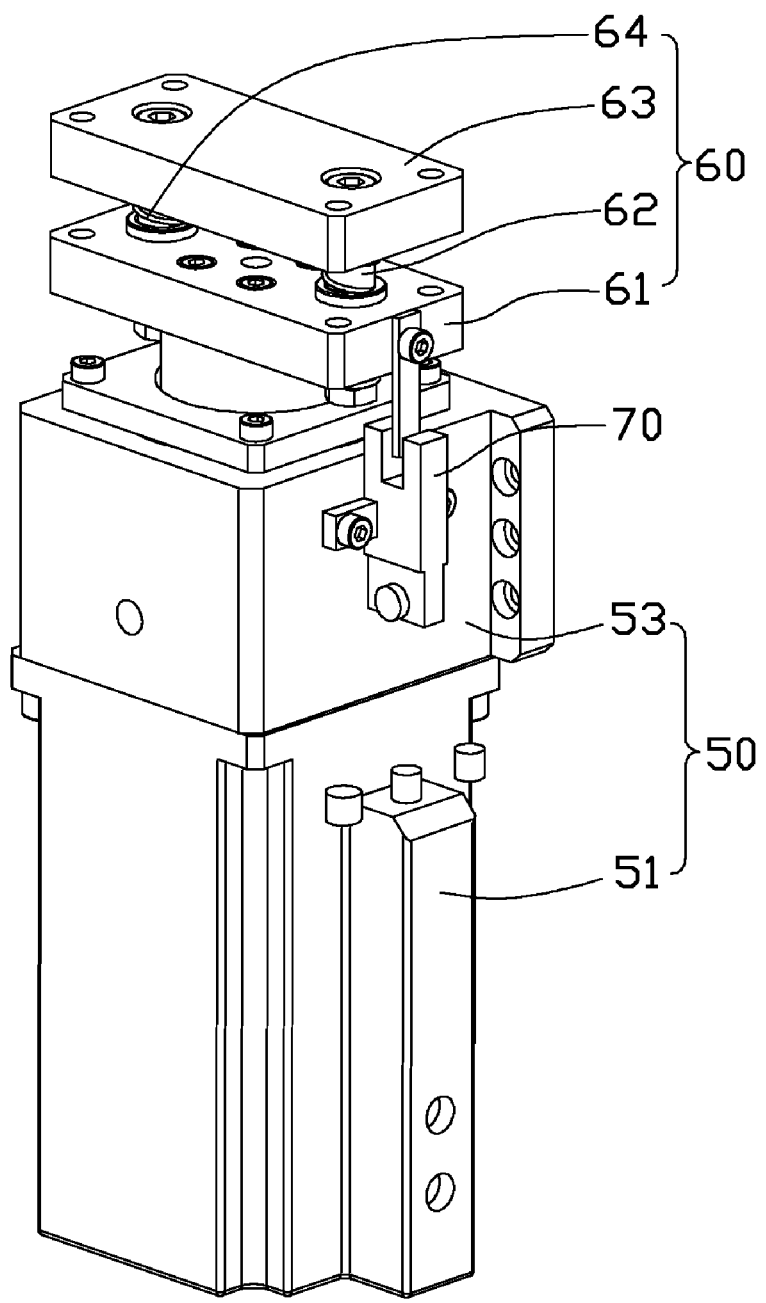
FIG. 6 is an assembled, isometric view of the fourth transmission mechanism, a cushion mechanism, and a sensor of FIG. 4.

Referring to FIGS. 4 and 6, the fourth transmission mechanism 50 includes a fourth driving module 51 and a deceleration device 53. The fourth driving module 51 is a motor; and the fourth driving module 51 connects with the deceleration device 53. The fourth transmission mechanism 50 is arranged between the partition board 42 and the back plate 46 of the third transmission mechanism 40, and is substantially side by side with respect to the third guide rail 44 and the lead screw 433.

The cushion mechanism 60 includes a cushion plate 61, two guide bars 62, an active plate 63, and two resilient members 64. The cushion plate 61 is connected to the output shaft (not shown) of the deceleration device 53. The guide bars 62 protrude from one side of the cushion plate 61 and are substantially parallel. The resilient members 64 are sleeved on the guide bars 62, respectively; and the resilient members 64 are arranged between the cushion plate 61 and the active plate 63. In the illustrated embodiment, the resilient member 64 is a helical compression spring.

In addition, the Cartesian coordinate robot 100 also includes a sensor 70 arranged on one side of the deceleration device 53, for sensing the rotation zero point of the deceleration device 53.

Referring to FIGS. 1 through 6, during assembly of the Cartesian coordinate robot 100, the first transmission mechanism 20 is secured between the base plate 11 and the top plate 12; and the first transmission mechanism 20 is fixed to the top plate 12. The fixing plate 31 of the second transmission mechanism 30 is fixed to the main body 251 of the first slider 25 of the first transmission mechanism 20. The mounting plate 41 of the third transmission mechanism 40 is fixed to the main body 371 of the second slider 37 of the second transmission mechanism 30. The fourth driving module 51 of the fourth transmission mechanism 50 is fixed to the main body 451 of the third slider 45 of the third transmission mechanism 40. The cushion plate 61 of the cushion mechanism 60 is fixed to the deceleration device 53 of the fourth transmission mechanism 50. The first guide rails 23 of the first transmission mechanism 20 are perpendicular to the second guide rails 35 of the second transmission mechanism 30 and the third guide rail 44 of the third transmission mechanism 40; and the second guide rails 35 are also perpendicular to the third guide rail 44. Therefore, the first guide rails 23, the second guide rails 35, and the third guide rail 44 substantially form a Cartesian coordinate.

During operation of the Cartesian coordinate robot 100, the motor 211 of the first transmission mechanism 20 rotates the lead screw 213, the screw thread structure (not shown) of the lead screw 213 converts the rotation of the lead screw 213 to linear movement of the moving portion 255 of the first slider 25, thus the first slider 25 slides along the first guide rails 23. The motor 331 of the second transmission mechanism 30 rotates the driving wheel 3351, and the transmission belt 3355 rotates the driven wheel 3353; thus, the lead screw 333 rotates along the driven wheel 3353. The rotation of the lead screw 333 also is converted to linear movement of the second slider 37 along the second guide rails 35 via the screw thread structure of the lead screw 333. The third transmission mechanism 40 is driven substantially the same as the second transmission mechanism 30. The fourth driving module 51 of the fourth transmission mechanism 50 drives the deceleration device 53. The deceleration device 53 decelerates the speed of the fourth driving module 51, and the output shaft of the deceleration device 53 rotates the cushion mechanism 60, such that a workpiece (not shown) that is connected to the active plate 63 can rotate together. The protective cover 14 can protect all four transmission mechanisms 20, 30, 40, 50 from outside accidental contact as well as preventing physical harm to any operator caused by accidental contact with the four transmission mechanisms 20, 30, 40, 50.

Each transmission mechanism of the Cartesian coordinate robot 100 is connected with one driving module, thus, the four transmission mechanisms 20, 30, 40, 50 can move simultaneously to position the workpiece more quickly. Working efficiency is thus increased.

In addition, the transmission assembly 335 of the second transmission mechanism 30 can substantially align the motor 331 and the lead screw 333 side by side, thus reducing the length of the second transmission mechanism 30. The second guide rails 35 and the lead screw 333 are substantially parallel, thus the other members of the second transmission mechanism 30 can be arranged more compactly to conserve space. The members of the third transmission mechanism 40 and the fourth transmission mechanism 50 are also arranged substantially side by side, thus the Cartesian coordinate robot 100 can be more compact and as small as possible.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A Cartesian coordinate robot, comprising:
a first transmission mechanism;
a second transmission mechanism connected to the first transmission mechanism; and
a third transmission mechanism connected to the second transmission mechanism;
wherein the first transmission mechanism comprises at least one first guide rail, a first slider slidably connected to the at least one first guide rail, and a first driving module driving the first slider; the second transmission mechanism comprises at least one second guide rail substantially perpendicular to the at least one first guide rail, a second slider slidably connected to the at least one second guide rail, a fixing plate connected to the first slider, and a second driving module driving the second slider, the second driving module comprises a motor, a lead screw, and a transmission assembly connected to the motor and the lead screw; wherein the motor and the lead screw are fixed on the fixing plate, and the second slider comprises at least one sliding portion connected to the at least one second guide rail and a moving portion connected to the lead screw; and the third transmission mechanism comprises at least one third guide rail substantially perpendicular to the at least one second guide rail and the at least one first guide rail, a third slider slidably connected to the at least one third guide rail, and a third driving module driving the third guide rail.

2. The Cartesian coordinate robot of claim 1, wherein the lead screw and the motor are arranged side by side of each other; the lead screw is substantially parallel to the at least one second guide rail.

3. The Cartesian coordinate robot of claim 1, wherein the transmission assembly comprises a driving wheel connected to the motor, a driven wheel connected to the lead screw, and a transmission belt looped around the driving wheel and the driven wheel.

4. The Cartesian coordinate robot of claim 1, wherein the third transmission mechanism further comprises a mounting plate connected to the second slider and a partition board substantially perpendicular to the mounting plate; wherein the at least one third guide rail and the third driving module are fixed on the partition board.

5. The Cartesian coordinate robot of claim 4, wherein the third driving module comprises a motor, a lead screw, and a transmission assembly connected to the motor of the third driving module and the lead screw of the third driving module; and the motor of the third driving module and the lead screw of the third driving module fixed on the partition board; wherein the third slider comprises at least one sliding portion connected to the at least one third guide rail and a moving portion connected to the lead screw of the third driving module.

6. The Cartesian coordinate robot of claim 5, wherein the motor and the lead screw of the third driving module are on opposite sides of the partition board, and the lead screw of the third driving module is substantially parallel to the at least one third guide rail.

7. The Cartesian coordinate robot of claim 1 further comprising a fourth transmission mechanism connected to the third slider.

8. The Cartesian coordinate robot of claim 7, wherein the fourth transmission mechanism comprises a fourth driving module and a deceleration device connected to the fourth driving module.

9. The Cartesian coordinate robot of claim 8 further comprising a cushion mechanism connected to the deceleration device.

10. The Cartesian coordinate robot of claim 9, the cushion mechanism comprises a cushion plate connected to the deceleration device, at least one guide bar protruding from the cushion plate, an active plate sleeving on the at least one guide bar, and at least one resilient member sleeving on the at least one guide bar; wherein the at least one resilient member is arranged between the cushion plate and the active plate.

11. The Cartesian coordinate robot of claim 1 further comprising a bracket on which the at least one first guide rail and the first driving module of the first transmission mechanism are fixed.

12. A Cartesian coordinate robot, comprising:
a first transmission mechanism
a second transmission mechanism slidably connected to the first transmission mechanism; and
a third transmission mechanism slidably connected to the second transmission mechanism;
wherein the first transmission mechanism comprises a first driving module sliding the second transmission mechanism relative to the first transmission mechanism, and a first slider connected to the first driving module; the second transmission mechanism comprises a fixing plate connected to the first slider, and a second driving module sliding the third transmission mechanism relative to the first transmission mechanism, the second driving module comprises a motor, a lead screw, and a transmission assembly connected to the motor and the lead screw; the motor and the lead screw are fixed on the fixing plate, and the second slider comprises at least one sliding portion connected to the at least one second guide rail and a moving portion connected to the lead screw; and the third transmission mechanism comprises a third driving module sliding a workpiece relative to the third transmission mechanism; wherein the sliding directions of the second transmission mechanism, the third transmission mechanism, and the workpiece are substantially perpendicular.

13. The Cartesian coordinate robot of claim 12 further comprising a fourth transmission mechanism connected to the third transmission mechanism; wherein the workpiece is connected to the fourth transmission mechanism.

14. The Cartesian coordinate robot of claim 13, wherein the third transmission connects with the second slider; and the third transmission mechanism further comprises a third slider connected to the third driving module, the fourth transmission connects with the third slider.

15. The Cartesian coordinate robot of claim 12, wherein the transmission assembly of the second driving module comprises a driving wheel connected to the motor, a driven wheel connected to the lead screw, and a transmission belt looped around the driving wheel and the driven wheel.

16. The Cartesian coordinate robot of claim 15, wherein the third transmission mechanism further comprises a mounting plate connected to the second slider and a partition board substantially perpendicular to the mounting plate; the third driving module is fixed on the partition board.

17. The Cartesian coordinate robot of claim 16, wherein the third driving module comprises a motor, a lead screw, and a transmission assembly connected to the motor and the lead screw of the third driving module; wherein the motor and the lead screw of the third driving module are fixed on opposite sides of the partition board.

* * * * *